United States Patent [19]

Inbar

[11] Patent Number: 4,745,483
[45] Date of Patent: May 17, 1988

[54] ELECTRONIC MULTI-IMAGER

[75] Inventor: Dan Inbar, Haifa, Israel

[73] Assignee: Elscint Inc., Boston, Mass.

[21] Appl. No.: 543,403

[22] Filed: Oct. 19, 1983

Related U.S. Application Data

[63] Continuation of Ser. No. 218,705, Dec. 22, 1980, abandoned.

[51] Int. Cl.⁴ .............................................. H04N 5/84
[52] U.S. Cl. .................................................. 358/244
[58] Field of Search ............... 358/244, 345, 347, 332, 358/335, 111, 160, 165, 183, 22

[56] References Cited

U.S. PATENT DOCUMENTS

| | | |
|---|---|---|
| 3,328,522 | 6/1967 | Stone . |
| 3,784,736 | 1/1974 | Novak . |
| 3,961,315 | 6/1976 | Yokoyama . |
| 4,058,832 | 11/1977 | Vagi . |
| 4,058,833 | 11/1977 | Meyer . |
| 4,063,280 | 12/1977 | Hattori et al. . |
| 4,163,249 | 7/1979 | Michael et al. . |
| 4,205,340 | 5/1980 | Kouno et al. . |
| 4,210,932 | 7/1980 | Dick et al. . |
| 4,227,215 | 10/1980 | Gurley et al. . |
| 4,249,211 | 2/1981 | Baba et al. . |
| 4,253,154 | 2/1981 | Russ et al. . |
| 4,266,242 | 5/1981 | McCoy . |
| 4,282,546 | 8/1981 | Reitmeier . |

OTHER PUBLICATIONS

Article by McCoy, "A New Digital Video Special-Effects Equipment, SMPTE Journal, Jan. 1978, vol. 87, pp. 20-23.

Primary Examiner—Donald McElheny, Jr.
Attorney, Agent, or Firm—Sandler & Greenblum

[57] ABSTRACT

An electronic multi-imaging system displays medical images obtained from scans of a patient, and stored in a digital memory, on the screen of a TV monitor. The medical images occupy different spatial locations on the screen and do not overlap. An optical system operatively associated with the screen focuses an image of the screen onto a sheet of photosensitive material such that each of the medical images occupies only a portion of the sheet at predetermined spatial locations that are functionally related to the predetermined spatial locations of the medical images on the screen of the TV monitor.

1 Claim, 3 Drawing Sheets

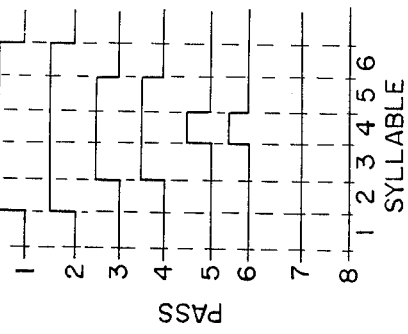
FIG. 6B.
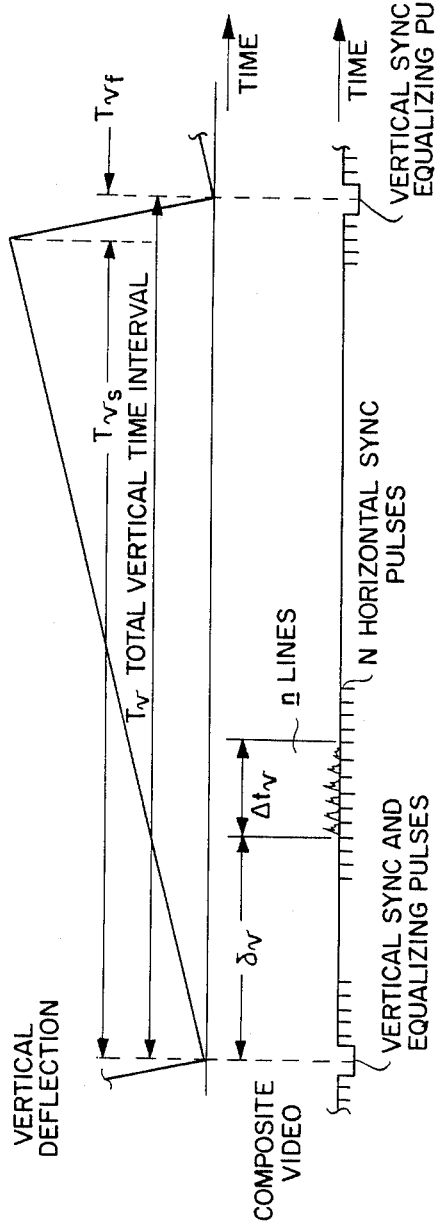
FIG. 3.
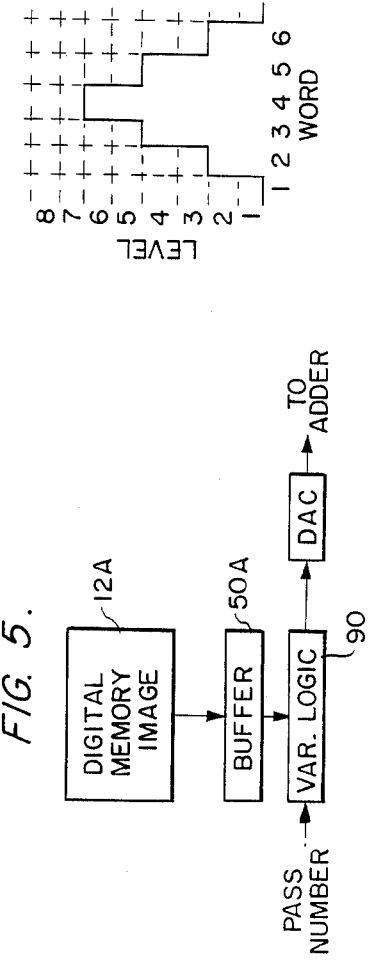
FIG. 6A.
FIG. 5.

ELECTRONIC MULTI-IMAGER

This is a continuation of application Ser. No. 218,705, filed Dec. 22, 1980 and now abandoned.

DESCRIPTION

1. Technical Field

This invention relates to a technique called multi-imaging by which a set of images sequentially displayed on a TV monitor are photographed on a single sheet of film such that the images on the film are arranged in a predetermined pattern.

2. Background Art

Multi-imaging is currently used in nuclear medical studies to organize a number of related images obtained by a gamma camera or a computerized axial tomographic scanner on a single sheet of film to facilitate medical analysis of the images. It is conventional practice to place a plurality of images (from 2–36) on a single sheet of x-ray film which may vary in size from $5'' \times 7''$ to $11'' \times 14''$. For example, the set of images on a film sheet may constitute a whole medical study and would include sequentially obtained images of different cross-sections of the same organ. Alternatively, the same image may be windowed, or the data of the image processed to enhance detail, and all of the images so obtained placed on the same film sheet.

In all of these studies, the input data are in the form of information stored in a digital memory and displayed in real time or after processing on a TV monitor. The image on the TV monitor is focused on a film sheet by an optical system that is part of the multi-imager. By reason of the optical system and relative movement between the TV monitor and the film, the image on the TV monitor can be projected onto a preselected location on the film sheet. Conventionally, this formatting is achieved in one of four ways:

(1) The TV monitor moves relative to a cassette holding the film, which is stationary and has a lens and a selectively operable shutter between the TV monitor and the cassette. The field of view of the lens comprehends the entire displacement of the TV monitor, and multiple exposures of the film are carried out by operating the shutter after the TV monitor has been indexed to a position relative to the cassette at which the image of the TV monitor will be focused on the proper location on the film.

(2) The TV monitor is stationary and the cassette holding the film moves. This is the converse of the first approach.

(3) The TV monitor and the cassette containing the film are both stationary. A multiple lens/shutter system is provided, each lens of the system having a field of view limited to the monitor but being focused on a different portion of the film. Selective operation of the shutters will place an image of the TV monitor in a desired location on the film.

(4) A combination of (1), (2) and (3). For example, three laterally displaced lens/shutter systems could be provided to selectively position an image at any of three different lateral locations. Either the film or the TV monitor could be moved transversally to provide transversally located images on the film.

In addition to the movements described above, it is often necessary to change formats from, say, a $2 \times 2$ arrangement to a $4 \times 4$ arrangement. As a consequence, conventional multi-imagers combine their x, y and z movements to achieve multi formatting and to change from one format to another.

While the above-described mechanical arrangements work reasonably well and are in wide use, the mechanisms are complex, and relatively large in order to accommodate the necessary movements involved. A non-mechanical arrangement would be highly desirable in order to reduce mechanical complexity and size. It is therefore an object of the present invention to provide a new and improved multi-imager that is entirely electronic in nature, and does not require relative movement between the TV monitor and the film in order to format images on the film.

There are many systems available that electronically change the size and/or position of the video image. The available systems however are primarily for use in television broadcasting studios and they are either relatively complicated and expensive and/or lose resolution during the change of size or position. However, there are not known systems that electronically vary the size and position of video images and enable the selective positioning of the reduced image without loss in resolution for multi-imaging purposes. The objectives of a multi-imaging system are different than for a TV broadcasting system and the problems encountered in each system are much different. Thus, at least the presently available studio systems cannot be used to electronically effect multi-imaging on a commercial basis.

DISCLOSURE OF INVENTION

The present invention provides an electronic imaging system for converting an image stored in a memory, which may be either digital or analog, to an image having a predetermined location on the screen of a stationary TV monitor whose screen is focused on a stationary film such that the relative position of the image on the screen is the desired location on the film. The system includes an image memory. The memory has n syllables of m words each having p levels. A control circuit having an N-lines per frame raster generator for producing N horizontal synchronization pulses per vertical synchronization pulse defining a frame is also provided. Data processing circuitry is used which is responsive to synchronization pulses for converting the n syllables from the memory into video signals, within the time in which the vertical synchronization pulses define a frame and in timed relationship to the horizontal synchronization pulses. The video signals each contain m signals representing a line of m picture elements of the image. The system also includes a TV monitor having a screen on which an electron beam is incident for producing a display, a deflection circuit responsive to the synchronization signals for scanning the screen and producing an N-line raster; and a modulation circuit responsive to the video signals for modulating the intensity of the beam during its scan. Finally, the system includes an optical lens for focusing the screen on a film plane.

In accordance with the invention, the raster generator of the control circuit has more lines than either the number of syllables or the number of words in a syllable. As a consequence of this situation, the picture elements of the image in the memory will occupy only a portion of the screen of the TV monitor.

The left margin of the image will be indented relative to the left raster margin by an amount that depends on the delay between converting a syllable into a video signal representing a line of picture elements of the image and the occurrence of a horizontal synchronization pulse. Such delay is adjustable thereby providing control over the horizontal positioning of the image on the TV monitor and thus on the film. On the other hand, the top margin of the image on the TV monitor will depend upon the delay between the start of conversion of the first syllable of the memory into a video signal and occurrence of a vertical synchronization pulse that marks the start of a frame. This delay is also adjustable thereby providing control over the vertical positioning of the image on the TV monitor and thus on the film.

By controlling the rate at which a syllable is converted into a video signal representing a line of picture elements of the image, the horizontal width of the image can be controlled, thereby permitting the image size to be increased or decreased electronically.

The n×m matrix constituting the memory may be derived from a (a)n×(b)m matrix (where a and b are integers) by an interpolation process in order to fit the image on the TV monitor into a predetermined size. In addition, by reason of the scanning speed of the TV monitor and bandwidth limitations associated therewith, it is sometimes not possible for the TV monitor to display all of the possible levels in each word in the digital memory. In such case, the memory can be converted into video signals level-by-level by making p passes of the memory. In the ith pass, a video signal of unit amplitude is produced for each word in the syllable in which the level in the word is greater than i—1. In this manner, the memory is scanned level-by-level and displayed on the TV monitor. Inasmuch as the photographic process involved is an integrating one, the resulting optical image will contain all of the information in the digital memory to the extent that the film itself is capable of reproducing the variations.

BRIEF DESCRIPTION OF DRAWINGS

An embodiment of the present invention is shown in the accompanying drawings wherein:

FIG. 3 is a time diagram showing the vertical deflection current for the TV monitor in association with the video signals;

FIG. 5 is a block diagram showing a variable logic device associated with a buffer for making multiple passes of the digital memory and reading it out;

FIG. 6A is a level diagram showing the contents of each word of a syllable; and

FIG. 6B is a time diagram showing the manner in which the syllable is sequentially read out using the apparatus shown in FIG. 5.

BEST MODE FOR CARRYING OUT THE INVENTION

Figure 1:
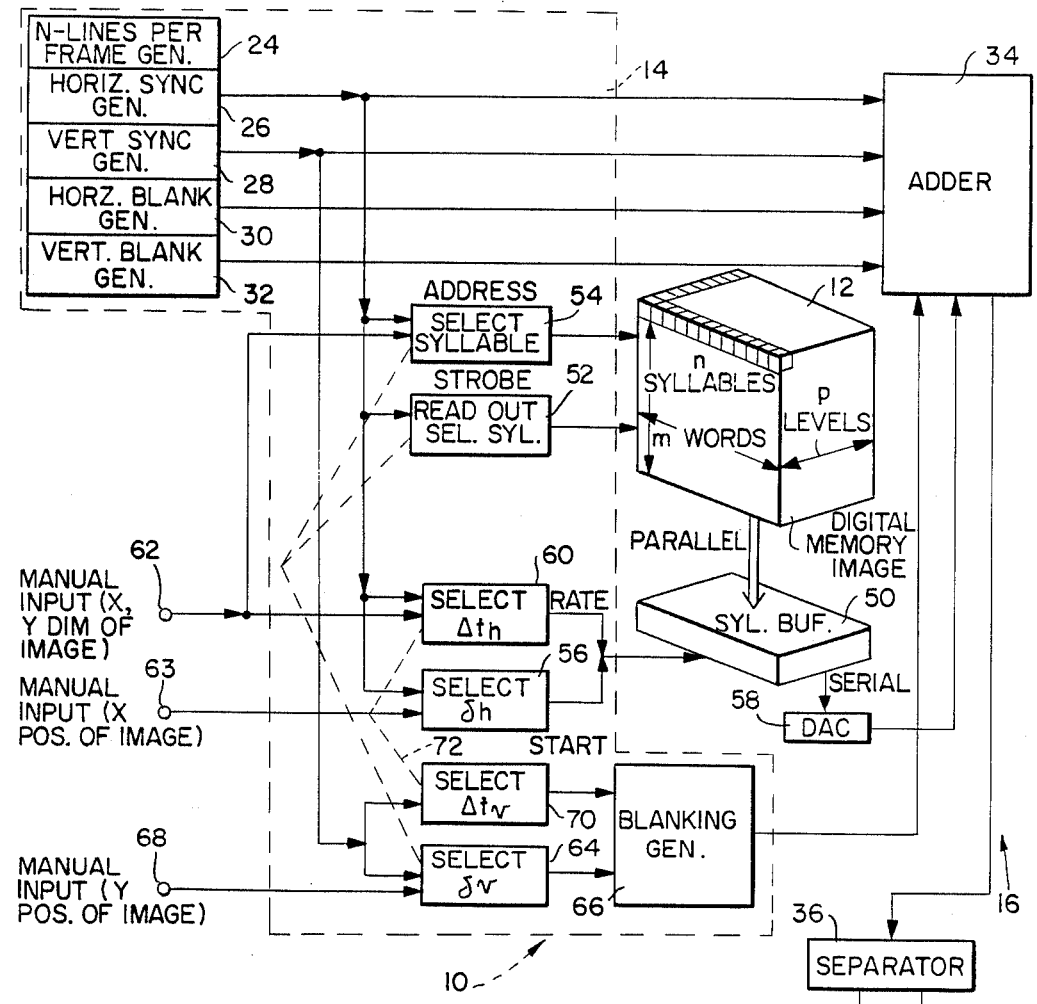
FIG. 1 is a block diagram of an electronic multi-imager according to the present invention.
Figure 1:
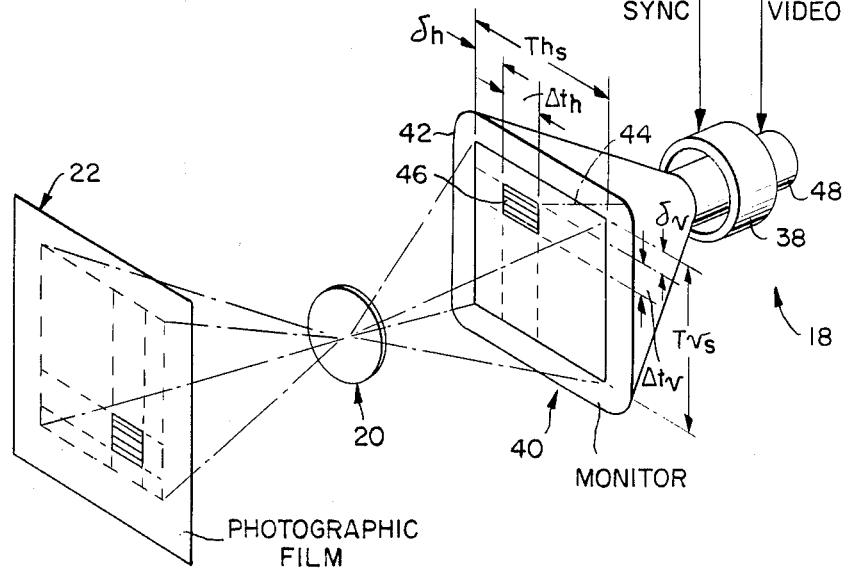

Referring now to FIG. 1 of the drawing, reference numeral 10 designates an electronic multi-imager according to the present invention. Multi-imager 10 comprises digital memory 12, control circuitry 14, video-processing circuitry 16, TV monitor 18, optical lens system 20 and film cassette 22. Digital memory 12 has n syllables of m words for storing a p level representation of an image where each word m has p levels. In other words, if m were 512 and p were 8, then each syllable in the memory would comprise typically 512 sets of registers each of which is eight bits in size.

Control circuit 14 includes an N-lines per frame raster generator 24 which produces N horizontal synchronization pulses for each vertical frame synchronization pulse in a manner well-known in the art. The time relationship between the vertical and horizontal synchronizing pulses is shown in the lower portion of FIG. 3 which shows a non-interleaved raster where the frequency of the vertical synchronizing pulses is 60 Hz and the frequency of the horizontal synchronic pulses depends on the number of lines per inch of the raster. For simplicity in illustrating the verticaly synchronizing pulses, the equalizing pulses that occur on each side of the vertical synchronizing pulse and the serrations within the vertical synchronizing pulses are omitted. However, the synchronizing signals are entirely conventional and are well-known in the art.

Generator 24 thus comprises a horizontal synchronizing generator 26 which produces N-horizontal synchronizing pulses within the frame time of the raster, vertical synchronization generator 28 which generates a vertical synchronizing pulse (and the necessary equillizing pulses every 1/60th seconds), horizontal blanking circuit 30 for generating blanking pulses that comprehend the horizontal synchronization pulses, and vertical blanking generator 32 for generating vertical blanking pulses that comprehend the vertical synchronizing pulses. The horizontal and vertical blanking pulses blank the screen during the horizontal and vertical retrace time of the electron beam on the screen.

All of the synchronizing pulses are combined in adder 34 whose output is applied through synchronization pulse separator 36 to TV monitor 18. Separator 36 separates any video signals present in the output of adder 34 from the synchronization pulses and applies the synchronization signals to the deflection circuit 38 of monitor 18.

Monitor 18 comprises a TV monitor 40 having screen 42 on which electron beam 44 is incident for producing display 46. The monitor also includes deflection circuit 38 responsive to synchronization signals supplied by separator 36 for causing beam 44 to scan screen 42 and produce an N-line raster as is well-known in the art. Beam 44 is modulated during its scan by modulating circuit 48 to which the video output of separator 36 is applied.

Associated with memory 12 is syllable buffer 50 which is capable of buffering a single syllable that is read-out in parallel from memory 12 in response strobing of circuit 52. Addressing of memory 12 is achieved by address circuit 54 which will select the particular syllable from memory 12 which is read out by circuitry 52.

In addition to generator 24 and circuits 52 and 54, control circuit 14 also includes strobe circuit 56 for initiating and carrying out a serial transfer of data in buffer 50 into the digital-to-analog-convertor (DAC) 58 whose output is applied to adder 34. The rate at which data are read out from buffer 50 is determined by circuit 60 in accordance with manual input 62.

The remaining parts of control circuit 14 include circuit 64 which controls blanking generator 66 producing selective blanking pulses intermediate horizontal synchronizing pulses, these pulses terminating subsequent to a vertical synchronization pulse after a time determined in accordance with the setting of manual input 68. Circuitry 70 also applied to blanking generator 66 determines the time during which the output of blanking generator 66 is suppressed. A relationship exists between the rate at which data is read out from the buffer 50 and the suppression of blanking pulses, and this interrelationship is indicated by connection 72.

In operation, generator 24 operates in a conventional way to cause electron beam 44 of the monitor to scan screen 42 producing an N-line raster. Circuit 54 clocked by the output of horizontal synchronization generator 26 will sequentially address the n-syllables in memory 12 beginning at a time relative to a vertical synchronizing pulse determined by manual input 68. This time delay between the occurance of the vertical synchronizing pulse and addressing of memory 12 as well as the strobing of the address in memory by circuit 52 is designated $\delta_v$ (see FIG. 3). For example, $\delta_v$ corresponds to a certain number of raster lines which would be blanked on the screen 42. Thus, $\delta_v$ is proportional to distance on the screen.

Figure 2:
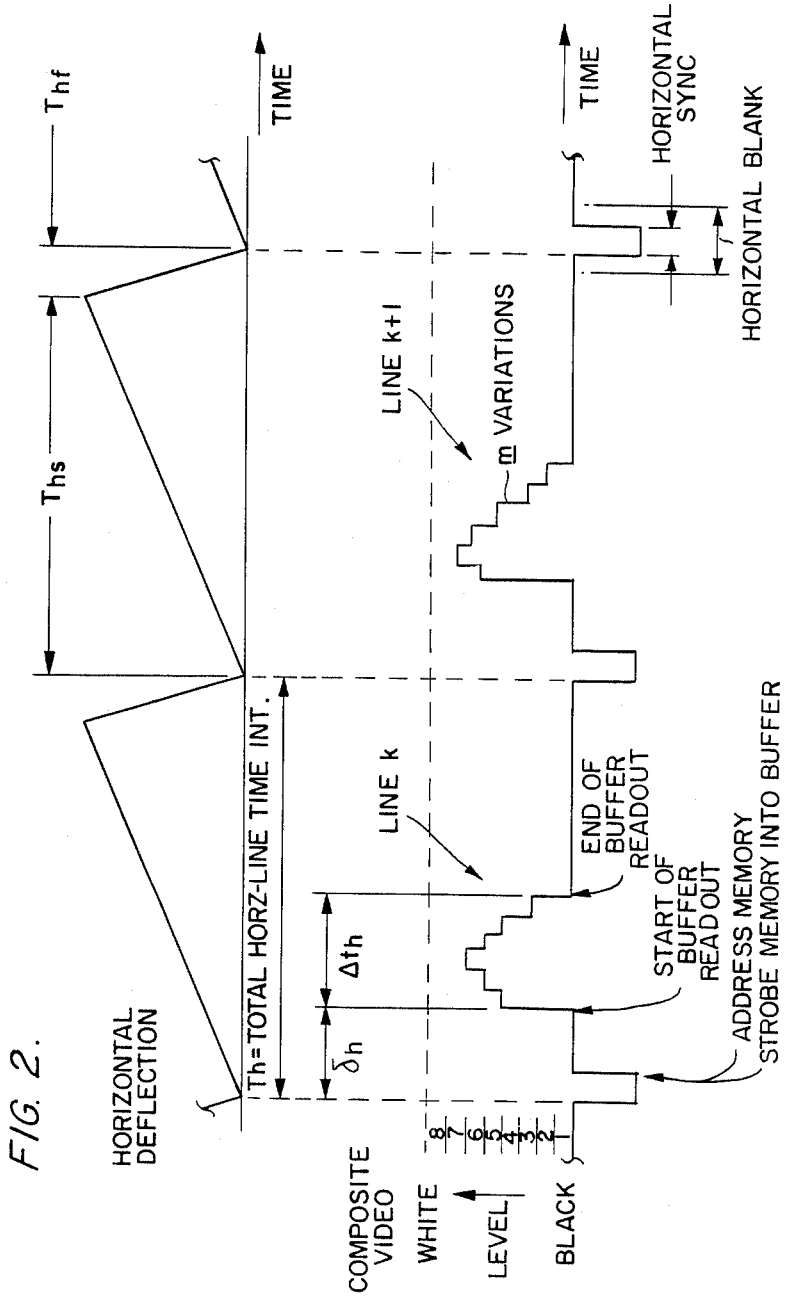
FIG. 2 is a time diagram showing the horizontal deflection current for the TV monitor and showing consecutive sets of video signals associated with the horizontal deflection current.

After the beam has scanned these blank lines, buffer 50 would contain the first syllable in memory 12, and this buffer would be strobed a period of time following the next horizontal synchronizing pulse determined by the setting of manual input 63. As shown in FIG. 2, this period of time is designated $\delta_h$. After the delay $\delta_h$, circuit 56 is effective to cause buffer 50 to be read out into DAC 58 at a rate determined by circuit 60 in accordance with manual setting 62. Normally, the rate at which data are serially transferred from the buffer into the digital-to-analog-converter would be the line frequency so that a video signal is produced at the output of circuit 58 representing one line of the image stored in memory 12. As shown in FIG. 2, the m variations in amplitude occur within the time interval th which, because m is less than N, will cause the video signal to occupy only a portion in the interval between successive horizontal synchronization pulses.

When the next horizontal sychronizing pulse occurs, the second line in memory 12 will be read into buffer 50 so that upon a delay of $\delta_h$, the second line of a memory will be transferred into DAC 58 and thus be converted into the video signal representing the second line of the picture elements of the image.

This process is repeated until the entire n syllables of the memory have been read out into buffer 50, the contents of the buffer being serially read out and converted into video signals. Each video signal begins a time $\delta_h$ following a horizontal synchronization pulse and lasts less than the horizontal-line scan of the raster. It causes the beam of the TV monitor to produce one horizontal line of the image comprising m picture elements. When all of the memory has been read out, image 46 appears on screen 42 as shown in FIG. 1 at a location dependent on $\delta_v$ and $_h$. From the above, it can be seen that the left margin of the image will be indented relative to the left raster margin by an amount that depends on the delay between converting a syllable into a video signal representing a line of picture elements of the image and the occurance of a horizontal synchronization pulse, namely the delay time $_h$. Such delay is selectively adjustable by reason of manual input 63. This provides a user with control over the horizontal positioning of the image on the TV monitor.

The top margin of the image on the TV monitor will depend upon the delay between the start of conversion of the first syllable of the memory into a video signal and the occurance of a vertical synchronizing pulse that marks the start of a frame. This last mentioned delay is designated $\delta_v$ as indicated in FIG. 3. This delay is also selectively adjustable by reason of manual input 68 thereby providing control over the vertical position of the image on the TV monitor. Thus, by suitable inputs at 63 and 68, an image representing the contents of memory 12 can be positioned in any location on the screen 42 allowing the user to select the ultimate location of the image on the film.

Normally, the rate at which data are read out from buffer 50 is the same as the line frequency of the monitor but this can be changed by suitable inputs at 62. This will enlarge or contract the size of the image on the screen.

Lens 20 focuses the screen on a film plane within cassette 22, the cassette containing a sheet of film 76 in the film plane. Consequently, image 46 on the screen 42 appears as image 46a on film 76. Therefore, suitable adjustment to the manual inputs 62, 63 and 68 will permit the user to locate an image contained in memory 12 at any place within a field of view determined by the raster on the film 76. In actual use, after an image has been properly located on the photographic film, memory 12 would be loaded with a new image and upon suitable adjustment to manual inputs 62, 63, and 68, the new image could be located at any desired position on the photographic film.

Figure 4:
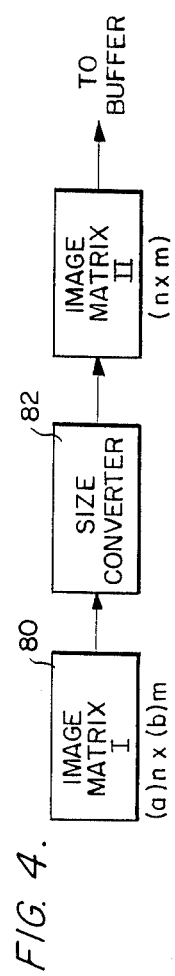
FIG. 4 is a block diagram showing the manner in which conversion from one matrix size to another matrix size is carried out.

Sometimes the initial image size is too large for being formatted on a given photographic film. When this occurs, the arrangement shown in FIG. 4 can be utilized. In this arrangement, an image matrix I of size $(a)n \times (b)m$ is converted, by an interpolation process carried out by size inverter 82, into image matrix II, that is $n \times m$ in size. Once this preprocessing is completed, the procedure described in connection with FIGS. 1–3 can be carried out to display the image on the screen of TV monitor and position it properly so that the image will be formatted properly on the film.

FIG. 2 includes a simplified showing of video signals wherein the amplitude at each of the m positions on a line has eight possible levels. In actual practice, the number of levels is usually greater than this; and 64 or even 128 levels are not unusual. In general, there will be p levels which means that the intensity of the electron beam scanning the screen must be able to vary by the factor p at each of the m positions in a line. When dealing with 1000 line or more rasters and levels of 64 or more, the bandwidth requirements of the electronics are often greater than can be achieved with conventional designs. Consequently, reproduction of an image on a TV monitor with all of the possible levels available in the memory cannot always be achieved.

In order to reduce the bandwidth limited repsonse of the TV monitor, the image can be built up on the screen, level-by-level, with the photographic film serving to integrate information in the digital image. With this approach, the beam need be switched either on or off at each picture element rather than modulated by the factor p.

FIG. 5 shows a way to achieve this result by reading out a p level digital image p times. Digital memory image 12A is buffered at 50A in the manner previously described in connection with FIG. 1. In this case, however, variable logic circuit 90 is associated with buffer 50A and serves to examine the level that is read-out of the buffer to logically determine whether the beam is to be turned on or off.

In operation, on the first pass through the memory, logic circuit 90 examines the first syllable in the buffer and converts the first syllable into a set of video signals that represent the first line of picture elements of the image. If the level of any word in the syllable exceeds level one, the amplitude of the signal representing, such word, thereby is unity, and will cause the beam to be turned on when the scan reaches this word producing a unit amount of light on the screen on the elemental area that represents the position of the word on the screen. The next $n-1$ syllables are sequentially inputted to the buffer and handled the same way.

When this first pass is complete, the second pass of the memory is executed, and the first syllable is again located in the buffer. This time logic circuit 90 determines whether the level of any word in the syllable exceeds level two; and if this is the case, the amplitude of the signal representing such word is unity while the amplitude of the signal representing any word whose level is less than level two will be zero. The readout continues until the second pass is completed. The third pass then begins and the process described above is repeated until p passes of the memory have been made. In general, on the ith pass, a video signal of unit amplitude is produced for each word in the syllable in which the level in the word is greater than $i-1$.

FIG. 6A shows a simplified video signal having 8 possible levels. The syllable from which this video signal was developed would be passed into the buffer 8 times as 8 passes would be made by variable logic 90. Words 2-6 of the syllable have a level exceeding unity so that the video output on the first pass of the syllable would be as indicated by line 1 in FIG. 6B. Successive passes would examine successive slices of the syllable producing video signals on each pass as indicated by lines 2-8 in FIG. 6B. Each of the eight video signals would produce, on the same line on the screen, a light pattern matching the signals in lines 1-8 of FIG. 6A.

As a consequence of this arrangement, each pass produces only on or off modulation of the video signal which is well within the bandwidth capability of the electronics. The film integrates all of the passes and will reproduce all of the detail contained in the image.

While the invention disclosed above utilizes a digital memory for storage purposes, the memory also can be in the form of an analog memory such as charge-coupled devices or in the form of a combination of analog and digital memory components. Moreover, the control circuit for generating the necessary synchronization signals for the raster, and the data processing circuitry for producing the sets of video signals, can be realized in whole or in part by digital or analog circuits, and in fact can be realized by programmable devices such as microprocessors.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. An electronic imaging system comprising:
 (a) a memory having n syllables of m words for storing a p level representation of a video image;
 (b) an N-lines per frame raster generator for producing N horizontal synchronization pulses per vertical frame synchronization pulse, wherein N is greater than either n or m;
 (c) data processing circuitry responsive to said synchronization pulses for converting said n syllables, within the time for vertical synchronization pulses to define a frame and in timed relationship to the horizontal synchronization pulses, into a plurality of video signals, each of which contains m signals and represents a line of m picture elements of the image;
 (d) a TV monitor having a screen on which an electron beam is incident for producing a display;
 (e) a deflection circuit responsive to said synchronization pulses for causing said beam to scan said screen and produce an N-line raster;
 (f) a modulation circuit responsive to said video signals for modulating the intensity of said beam during its scan;
 (g) an optical lens system for focusing said screen on a film plane, and
 (h) means for making p passes into the p level memory and for producing a video signal of unit amplitude on the ith pass for each word having a level greater than $i-1$.

* * * * *